United States Patent
Ito et al.

(10) Patent No.: US 6,336,155 B1
(45) Date of Patent: *Jan. 1, 2002

(54) SYSTEM FOR CONTROLLING POWER TO STOP OUTPUTTING DATA FROM A FIRST PORT AFTER DETECTING A CONNECTION OF AN EXTERNAL DEVICE TO A SECOND PORT

(75) Inventors: Masamichi Ito, Machida; Koji Takahashi, Chigasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 08/995,897

(22) Filed: Dec. 22, 1997

(30) Foreign Application Priority Data

Dec. 27, 1996 (JP) ..................................................... 8-350181

(51) Int. Cl.[7] .............................. G06F 13/10; H04L 12/50
(52) U.S. Cl. .................................. 710/37; 710/36; 710/38; 713/300
(58) Field of Search .................................. 710/40, 37, 38, 710/131, 101–103, 36; 709/239–240; 713/300, 320, 324

(56) References Cited

U.S. PATENT DOCUMENTS

| 4,922,448 A | * | 5/1990 | Kunieda et al. | ......... 395/750.03 |
| 5,438,359 A | * | 8/1995 | Aoki | ............................ 348/207 |
| 5,535,371 A | * | 7/1996 | Stewart et al. | .......... 395/500.46 |
| 5,594,920 A | * | 1/1997 | Ebina et al. | ..................... 705/24 |
| 5,668,419 A | * | 9/1997 | Oktay | ............................. 307/126 |
| 5,781,744 A | * | 7/1998 | Johnson et al. | ............... 710/103 |
| 5,787,307 A | * | 7/1998 | Imoto | ............................. 395/836 |
| 5,829,015 A | * | 10/1998 | Maeno | ........................... 711/104 |
| 5,832,244 A | * | 11/1998 | Jolley et al. | ................... 395/309 |
| 5,835,862 A | * | 11/1998 | Nykanen et al. | ............. 455/558 |
| 5,877,869 A | * | 3/1999 | Tachibana | ....................... 358/437 |
| RE36,182 E | * | 4/1999 | Bowers et al. | ................ 709/220 |
| 5,898,861 A | * | 4/1999 | Emerson et al. | .............. 395/527 |

FOREIGN PATENT DOCUMENTS

| EP | 0554878 | 8/1993 | ................ G06F/3/12 |
| EP | 0632393 | 1/1995 | ............. G06F/13/40 |
| JP | 5-276516 A | * 10/1993 | |

* cited by examiner

Primary Examiner—Thomas Lee
Assistant Examiner—Iliob Park
(74) Attorney, Agent, or Firm—Fitzpatrick, Cella, Harper & Scinto (57) ABSTRACT

In a data communication apparatus provided with first and second digital interfaces respectively connectable to first and second external devices, communication (including synchronous communication and asynchronous communication) is conducted between the first external device and the first digital interface. When connection between the second digital interface and the second external device is detected, priority is given to communication with the second external device connected to the second digital interface. Preferably, the data communication apparatus causes the first external device to recognize the new connection configuration. As a result, the data communication apparatus can rapidly conduct data communication with a prescribed device without imposing a large load on the network.

53 Claims, 7 Drawing Sheets

SYSTEM FOR CONTROLLING POWER TO STOP OUTPUTTING DATA FROM A FIRST PORT AFTER DETECTING A CONNECTION OF AN EXTERNAL DEVICE TO A SECOND PORT

BACKGROUND OF THE INVENTION

1. Field of the Invention

The present invention relates to a data communication system, apparatus, and method, and more particularly, to a technique of communication of data via a digital interface.

2. Description of the Related Art

It has been the conventional practice to connect peripheral equipment such as a hard disk or a printer to a personal computer (hereinafter referred to as "PC") via a digital interface (hereinafter referred to as "I/F") such as an SCSI or an IDE, thereby conducting communication of digital information data with PC.

AV (audio-visual) devices such as a digital camera and a digital video camera so far not falling under peripheral equipment of a PC have now serve as input units to the PC as a result of progress made in this area. Various techniques are being developed for such input units, for example, entering moving images or a still image taken by any of these devices into a PC, processing and editing the image on the PC, and storing the resultant image in a hard disk or printing it out on a printer.

However, it has been difficult to send in a real-time manner digital data in a large quantity such as animation images from a digital video camera to a PC through a digital I/F such as an SCSI conventionally used for a hard disk or a printer, because of a low data transfer rate. Further, the conventional digital I/F, based on parallel communication, have large connectors and cables, are not suitable for an interface for a portable device requiring downsizing such as a digital camera and a digital video camera. In the conventional digital I/F, inconveniences have been pointed out in many aspects, including limitations of the connecting method, and complicated setting upon connecting. AV devices such as a digital camera and a digital video camera have therefore been connected to a PC via a digital I/F based on a technique different from that of the digital I/F such as an SCSI.

In a network in which a PC is connected to peripheral equipment and an AV device, when image information of the AV device is printed out, it has been necessary first to transfer image information via a digital I/F different from the conventional one, and further, to output from the PC to a printer via a conventional I/F. As a result, the AV device transmitting data in a large quantity to the PC poses a considerable load on the PC itself, and causes the network to be seriously crowded. Depending upon operation of the PC, it is affected by communication between other devices on the network, thus leading to a problem of making it impossible to normally print out the image information of the AV device.

SUMMARY OF THE INVENTION

An object of the present invention is to solve the above-described problems.

Another object of the invention is to achieve rapid data communication, in a data communication apparatus, with a prescribed device without applying a large load on the network.

As a preferred embodiment for such objects, the invention provides a data communication apparatus, comprising (a) first and second connecting means for connecting said apparatus to respective first and second external devices through respective first and second transmission lines, said first and second transmission lines transmitting digital data; (b) communication means for communications with the external device connected to said first or second connecting means; (c) detecting means which detects connection of the second external device to said second connecting means; and (d) control means for giving priority to communication between said communication means and the second external device connected to said second connecting means in response to the detection of said detecting means.

As another embodiment, the invention provides a data communication apparatus comprising (a) a first port connectable to a first data bus; (b) a second port connectable to a second data bus; (c) communication means for performing data communication with one of said first and second data buses through the corresponding first or second port; and (d) control means for causing a re-configuration of said first data bus in response to a connection of said second port to said second data bus.

As another embodiment, the invention provides a data communication apparatus, comprising (a) first and second communication means respectively communicable with first and second external devices; (b) power supply means which supplies power to said first and second communication means; (c) detecting means which detects a connection between said second communication means and the second external device; and (d) control means which controls said power supply means so as to change the power supplied to said first and second communication means in response to the detection of said detecting means.

As another embodiment, the invention provides a data communication apparatus, comprising (a) first communication means communicable with a first data bus; (b) second communication means communicable with a second data bus; (c) detecting means which detects the connection of an external device to said second communication means; and (d) control means which causes said first communication means to discontinue communication with said first data bus in response to the detection of said detecting means.

Another object of the invention is to achieve rapid data communication, in a data communication method, with a prescribed device without applying a large load on the network.

As a preferred embodiment for such an object, the invention provides a data communication system, comprising (a) first and second connecting means for connecting said apparatus to respective first and second external devices through respective first and second transmission lines, said first and second transmission lines transmitting digital data; (b) communication means for communicating with the external device which is currently connected to said first or second connecting means; (c) detecting means which detects the connection of the second external device to said second connecting means; and (d) control means which gives priority to communication between the communication means and the second external device connected to said second connecting means when said detecting means detects connection of said second external device to said second connecting means.

As another embodiment, the invention provides a data communication system, comprising (a) a first port connectable to a first data bus; (b) a second port connectable to a second data bus; (c) communication means for performing data communication with one of the first and second data buses through one of said first and second ports identified as being valid; and (d) control means for causing said first data bus to recognize data bus configuration in response to the connection of said second port to said second data bus.

As another embodiment, the invention provides a data communication system, comprising (a) first and second communication means respectively communicable with first and second external devices; (b) power supply means for supplying power to said first and second communication means; (c) detecting means which detects the connection of said second communication means to the second external device; and (d) control means which controls said power supply means so as to change power supplied to said first and second communication means in response to said detecting means detecting the connection of said second communication means to the second external device.

As a further embodiment, the invention provides a data communication system, comprising (a) first communication means communicable with a first data bus; (b) second communication means communicable with a second data bus; (c) detecting means which detects the connection of an external device to said second connecting means; and (d) control means which controls said first communication means so as to discontinue communication with said first data bus in response to said detecting means detecting the connection of the external device to said second connecting means.

Another object of the invention is to achieve rapid data communication, in a data communication system, with a prescribed device without applying a large load on the network.

As a preferred embodiment for such an object, the invention provides a method of data communication, comprising the steps of: (a) providing first and second communication interfaces for communicating with respective first and second external devices over respective first and second transmission lines, said first and second transmission lines transmitting digital data; (b) detecting a connection of the second external device to said second interface; and (c) giving priority to communication with the second external device connected to said second interface in response to the result of detection obtained from said detecting step.

As another embodiment, the invention provides a method of data communication, comprising (a) a setting step of selecting as valid one of a first port connectable to a first data bus and a second port connectable to a second data bus; (b) a communicating step of conducting data communication via the first or second data bus selected as valid in said setting step; and (c) a control step of causing said first data bus to recognize a new bus configuration in response to a connection of said second port to the second data bus.

As another embodiment, the invention provides a method of data communication, comprising (a) a power supplying step of supplying power to first and second digital interfaces communicable with respective first and second external devices; (b) a detecting step of detecting a connection of said second digital interface to the second external device; and (c) a control step of changing power supplied to said first and second digital interfaces in response to the detection obtained from said detecting step.

As a further embodiment, the invention provides a method of data communication, comprising (a) a communicating step of conducting communication with a first data bus via a first digital interface; (b) a detecting step of detecting the connection of an external device to a second digital interface communicable with a second data bus; and (c) a control step of controlling said first digital interface so as to discontinue communication with said first data bus in response to the result of detection obtained from said detecting step.

Still other objects of the present invention, and the advantages thereof, will become fully apparent from the following detailed description of the embodiments.

DESCRIPTION OF THE PREFERRED EMBODIMENTS

The preferred embodiments of the present invention will now be described in detail hereinafter with reference to the accompanying drawings.

1. First Embodiment

Figure 1:
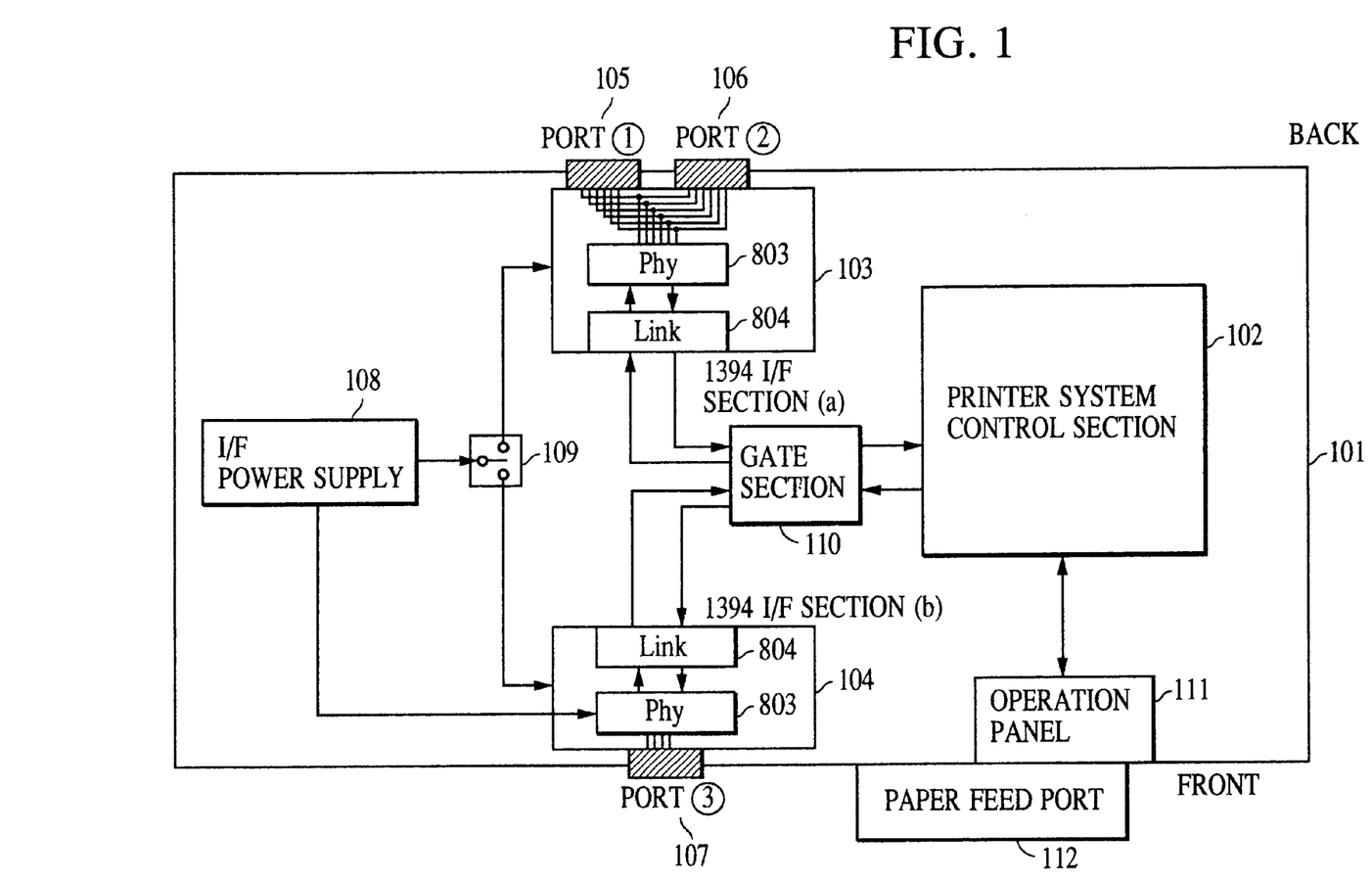
FIG. 1 is a block diagram illustrating a configuration of a printer 101 in a first embodiment of the invention.

FIG. 1 is a block diagram illustrating a configuration of a printer in a first embodiment of the present invention. The printer shown in FIG. 1 is configured to be connected to other digital devices by the use of a digital I/F conforming to the IEEE1394-1995 high-performance serial bus standard (hereinafter referred to as "IEEE1394"). The IEEE1394 serial bus will be briefly described below. Details of the IEEE1394 are described in the "IEEE Standard for a High Performance Serial Bus", published by the Institute of Electrical and Electronics Engineers, Inc., 345 East 47th Street, New York, N.Y. 10017, USA, Aug. 30, 1996.

Figure 6:
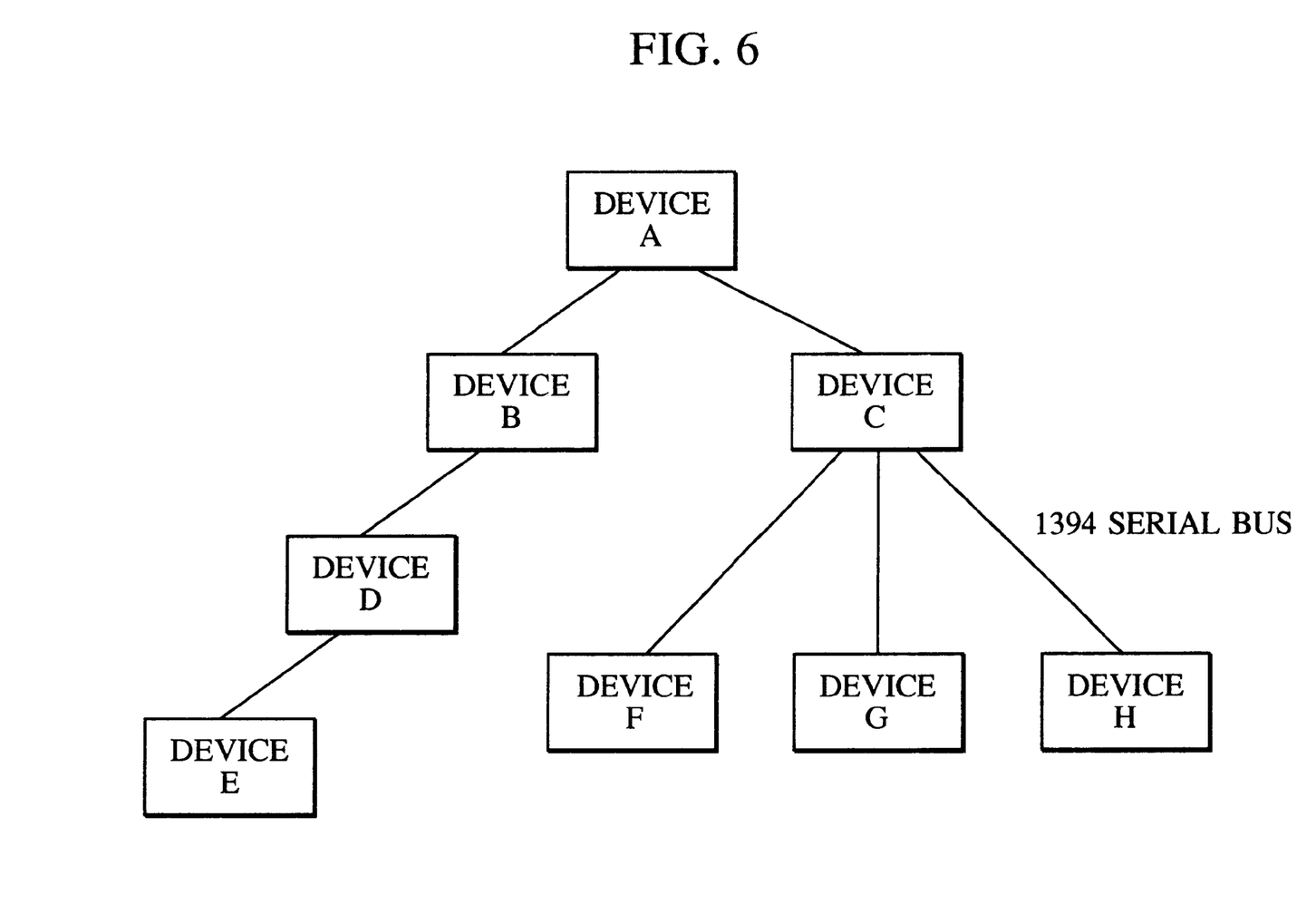
FIG. 6 illustrates a network built by the use of a digital I/F in conformity to an IEEE1394 serial bus.

A typical network system built by the use of a digital I/F conforming to the IEEE1394 Serial Bus Standard is illustrated in FIG. 6. Each of devices A, B, C, D, E, F, G and H of this system is provided with an IEEE1394 I/F, and A and B, A and C, B and D, D and E, C and F, C and G, and C and H are connected with twist pair cables of IEEE1394 serial bus. Examples of these devices A to H include a digital VTR, a DVD, a digital camera, a hard disk, and a monitor.

These devices may be connected by the daisy chain technique and the node technique in mixture, thus permitting connection with high flexibility.

Each device has its own ID information, and the devices form a network within a range of connection with 1394 serial buses through mutual recognition. By only sequentially connecting these digital devices via IEEE1394 I/Fs, the individual devices perform relay of transferred data, thus forming a network as a whole. The IEEE1394 has a plug and play function, which permits automatic recognition of the devices connected to the network without turning off the power supply for the entire network.

When all the devices are deleted from the network or a new device is added, for example, in an IEEE1394 network as shown in FIG. 6, the network can perform an operation of recognizing the new network after automatic resetting, i.e., after resetting the existing network configuration. Because of this function, the IEEE1394 network can always recognize a change in connection configuration of the network.

The IEEE1394 network is provided with three data transfer rates 100, 200 and 400 Mbps, and devices having higher transfer rates support lower transfer rates to ensure compatibility.

There are available two data transfer modes for the network shown in FIG. 6: an asynchronous transfer mode for transferring data asynchronously transferred from time to time such as a control signal (asynchronous data: hereinafter referred to as "async-data") and an isochronous transfer mode for transferring data to be continuously transferred at a constant data rate such as video data and audio data (isochronous data: hereinafter referred to as "iso-data"). These async-data and iso-data are transferred in mixture within a cycle in the order of iso-data and then async-data following a cycle start packet (CSP) indicating the start of a cycle within a communication cycle (usually 125 m per cycle). A transfer band of iso-data is ensured within each cycle.

Figure 7:
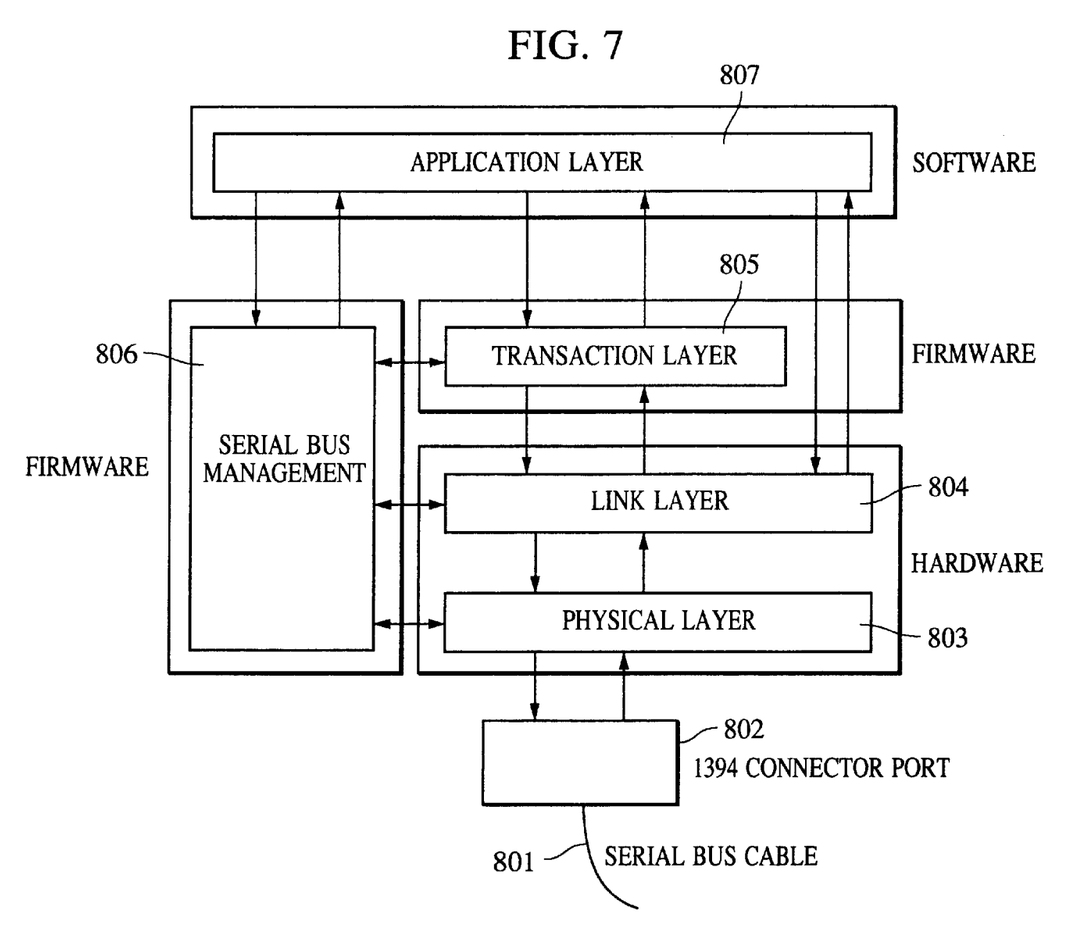
FIG. 7 illustrates components of the IEEE1394 serial bus.

Now, protocol layers of the IEEE1394 serial bus are shown in FIG. 7.

The IEEE1394 serial bus as a whole is composed of a plurality of layers. In FIG. 7, 801 is a serial bus cable conforming to the IEEE1394 Serial Bus Standard, which is connected to a physical layer 803 and a link layer 804 contained in a hardware section via a connector port 802 of the IEEE1394 I/F.

The hardware section is a substantial portion of an interface chip. The physical layer 803 conducts coding and decoding of an input/output signal and control of the connector port 802, and the link layer 804 performs packet transfer and cycle time control.

A transaction layer 805 of a firmware section controls data to be transferred (transacted), and issues commands such as Read and Write. A serial bus management layer 806 manages the status of connection of connected devices and ID information (node ID), and control the network configuration.

The components up to the hardware section and the firmware section are included in the substantial configuration of the IEEE1394 serial bus.

An application layer 807 of a software section varies with the software program used and controls how to conduct input/output of data for transfer on the IEEE1394 serial bus: for example, moving images are controlled by a protocol such as an AV protocol.

Each of the devices (nodes) connected on the IEEE1394 serial bus is assigned ID information, i.e., a node ID, by means of which the network configuration can be recognized.

When a change occurs in the network configuration, for example, when a change occurs on the network as a result of an increase or a decrease in the number of nodes caused by pullout of a node or ON/OFF of the power supply, and it is necessary to recognize a new network configuration, the node which detects the change transmits a bus reset signal on the bus to enter into a mode for recognizing the new network configuration. The detection of such a change is accomplished by detecting a change in bias voltage in the IEEE1394 connector port 802 and the physical layer 803.

A bus reset signal issued by a node is entered into the physical layer 803 of each node. The physical layer 803 of each node communicates the occurrence of a bus reset to the link layer 804, and at the same time, transfers the bus reset signal to other nodes. Finally, after all the nodes have detected the bus reset signal, the bus reset (i.e., recognition processing of the network configuration) is started.

Bus reset can be started by hardware detection caused by pullout of the cable or an abnormality in the network as described above, or by protocol's issuing a command directly to the physical layer through host control.

Upon start of bus reset, data transfer is temporarily interrupted, data transfer being in standby during this interruption, and after the end of this interruption, restarted under the new network configuration.

Now, the configuration of the printer shown in FIG. 1 will be described below.

In FIG. 1, 101 is a printer; 102 is a printer system control unit for controlling the entire printer 101; 103 is an IEEE1394 I/F section (a); 104 is an IEEE1394 I/F section (b); 105 is a connector port (1) for the I/F section (a) 103; 106 is a connector port (2) for the I/F section (a) 103; 107 is a connector port (3) for the I/F section (b) 104; 108 is an I/F power supply for supplying power to the I/F sections (103 and 104); 109 is a switch for disconnecting/supplying I/F power 108 to the I/F sections (103 and 104) as required; 110 is a gate section for selecting the I/F sections (103 and 104) capable of acting in linkage with the printer system control section 102.

An operation panel 111 for setting functions for the printer 101 and a paper feed port 112 are arranged on the front of the printer 101. The port (3) 107 is also arranged on the front of the printer 101 as shown in FIG. 1.

A six-pin cable including a power supply line can be connected to the port (1) 105 and the port (2) 106, with a maximum transfer data rate of 400 Mbps, whereas a four-pin cable can be connected to the port (3) 107, with a maximum transfer data rate of 100 Mbps.

The foregoing IEEE1394 I/F sections (a) 103 and (b) 104 form a configuration conforming to the IEEE1394-1995 Serial Bus Standard.

Now, operations of the printer 101 in the first embodiment of the invention, having the configuration as described above, will be described below.

The printer 101 shown in FIG. 1 is usually set so as to supply power from the I/F power supply 108 to the I/F section (a) 103. A network can be built by connecting directly or indirectly the I/F section (a) 103 to the connector ports (1) 105 and (2) 106 and a digital device having the same IEEE1394 I/F. When the I/F section (a) 103 is valid, the printer 101 serves as a network printer, and can print an output from another digital device in the network.

When the setting is made so as to supply power from the I/F power supply to the I/F section (a) 103 as described above, the switch 109 for selecting a supply source of power and the gate circuit 110 for selecting a communication destination of the printer system control section 102 select the I/F section (a) 103 side. However, the I/F power supply 108 supplies the minimum bias so as to permit detection of the connection of the connector port (3) 107 of the I/F section (b) 104 to the other device.

When a digital device having an IEEE1394 I/F is connected to the connector port (3) 107 of the I/F section (b) 104, the physical layer of the IEEE1394 I/F section (b) 104 detects the connection. This result of detection is sent to the printer system control section 102 which instructs the gate circuit 110 and the switch 109 to switch over the interface. In compliance with this instruction, the gate circuit 110 releases the connection with the I/F section (a) 103, and performs switching so that connection with the I/F section (b) 104 becomes valid. The switch 109 also switches power supply from the I/F power supply from the I/F section (a)

103 to the I/F section (b) 104. In other words, the printer 101 can conduct communication only with the device connected to the I/F section (b) 104. When the I/F section (b) 104 is valid, the printer 101 serves as a direct printer.

While the I/F section (b) 104 detects insertion/removal of the connector by a method conforming to the IEEE1394 Standard, means for detecting physical insertion/removal of the connector may be provided in the connector port (3) 107 itself, thereby detecting the same.

When connection of any other device is detected by the I/F section (b) 104, as described above, the printer 101 temporarily interrupts communication with the individual devices connected to the I/F section (a) 103 or finishes completely, and starts preferentially communication with the digital devices connected to the I/F section (b) 104.

When power is supplied to the I/F section (b) 104, the setting is such that the printer 101 disconnects supply of power to the I/F section (a) 103. As a result, each of the digital devices connected to the I/F section (a) 103 and forming the network deems power of the printer 101 itself to be turned off (detected), and conducts resetting to build again a new network in a configuration except for the printer 101. In this embodiment, the foregoing bus reset is accomplished by a method conforming to the IEEE1394 Standard. Upon detection of connection to the I/F section (b) 104, it is also possible that the printer 101 itself transmits a signal requiring bus reset on the network connected to the I/F section (a) 103.

The connector port (3) 107 of the I/F section (b) 104 is provided at a position permitting insertion and removal from the front or front side, i.e., from the front of the printer 101 so as to enable the user to easily conduct connection with digital devices allowing temporary connection as in a digital camera or a digital video camera. In this embodiment, the face containing the paper feed port 112 and the operation panel 111 serves as the front (front face).

As described above, the printer 101 is usually set so as to serve as a network printer, and may be designed so as to serve as a direct printer when temporarily connectable digital devices such as a digital camera or a digital video camera.

Figure 2:
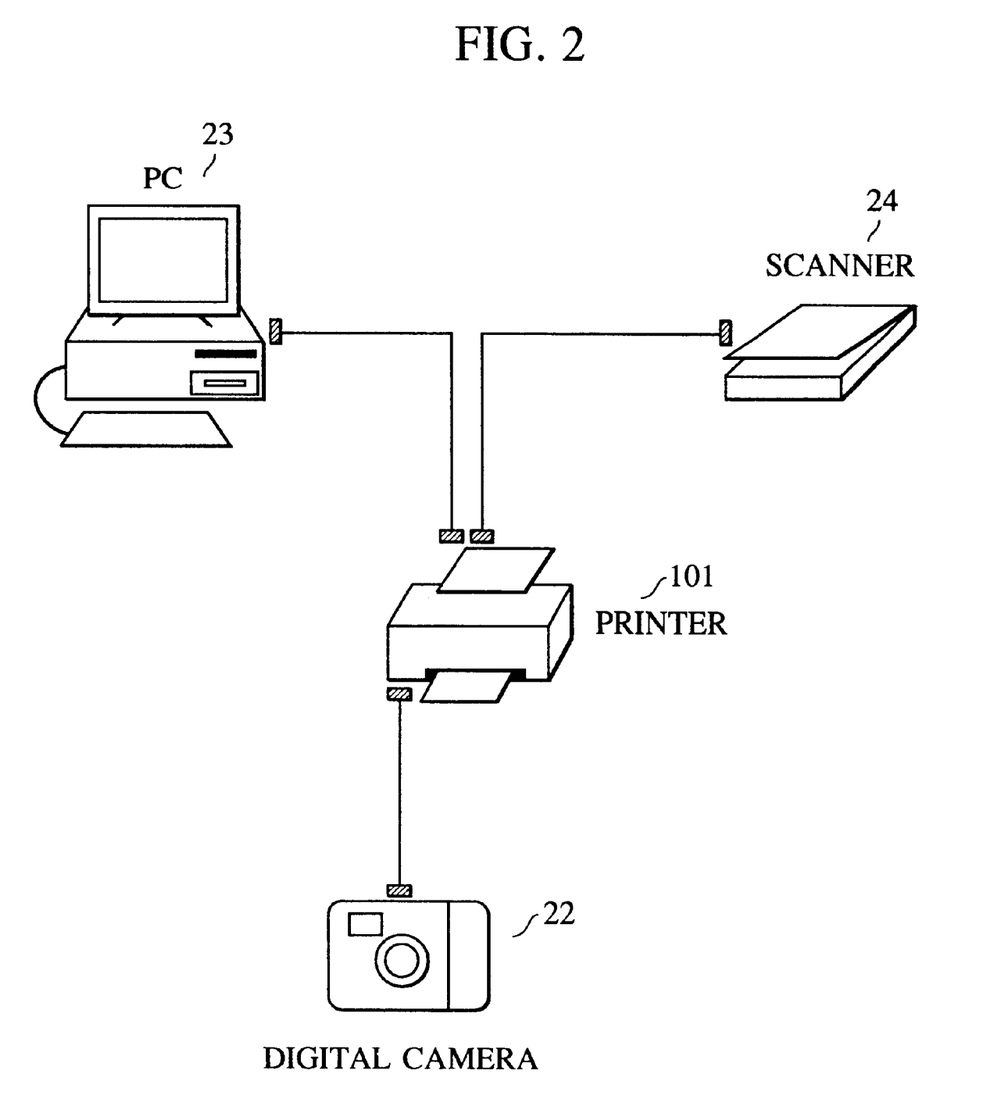
FIG. 2 illustrates a typical network using the printer 101.

FIG. 2 illustrates a typical network comprising the printer 101 and a plurality of digital devices.

In FIG. 2, the printer 101 is connected to the PC 23 and the scanner 24 (the other digital devices) via the IEEE1394 I/F to form a network. In this configuration, a digital camera 22 having the IEEE1394 I/F can be at any time connected to the connector port (3) 107 provided on the front of the printer 101.

When the digital camera 22 is connected to the printer 101, the printer 101 detects this connection, finishes communication with the network built with the PC 23 and the scanner 24 as described above, and begins communication only with the digital camera 22. As a result, image data from the digital camera 22 can be directly communicated with the printer 101 for printing, so that it is not necessary to print via the PC 23 as before. Since the digital camera 22 can use the printer 101 exclusively, it is possible to perform rapid communication of image data in a very large amount without being affected by the other digital devices.

While the network shown in FIG. 2 is composed of the PC 23 and the scanner, it is naturally possible to further connect a plurality of another digital devices.

Figure 3:
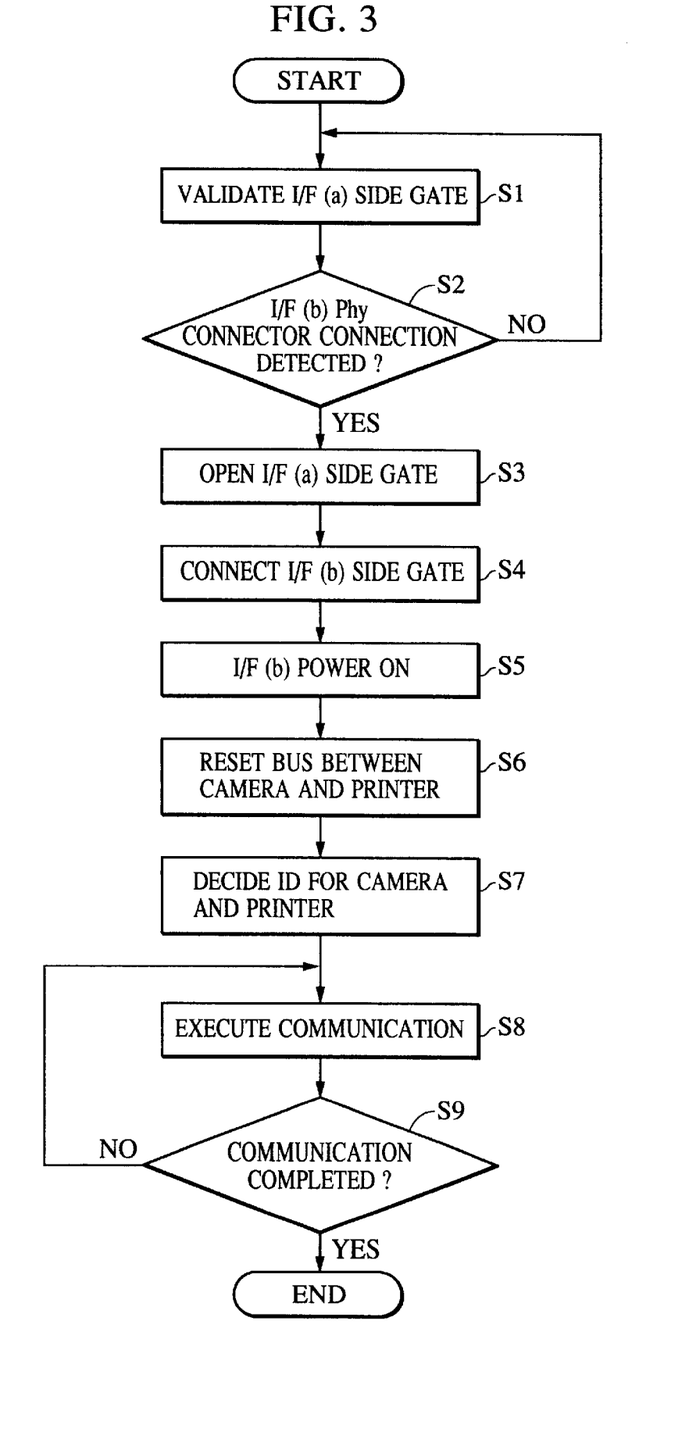
FIG. 3 is a flowchart illustrating operations of the printer 101 upon connection to the network shown in FIG. 2.

FIG. 3 is a flowchart illustrating operations of the printer 101 in the configuration of the network shown in FIG. 2.

In step S1, the printer 101 forms a network with a plurality of digital devices (for example, a PC 23 and scanner 24) connected to the ports 105 and 106, with a valid I/F section (a) 103 shown in FIG. 1, and performs communication with the individual digital devices via the I/F section (a) 103. At this point, a gate circuit 110 is set so that the individual digital devices connected to the I/F section (a) 103 can communicate with the printer system section 102, and connection with the I/F section (b) 104 is open. An I/F power supply 108 supplies power to the I/F section (a) 103 side.

In step S2, the I/F section (b) 104 detects whether or not digital devices such as a digital camera 22 have been connected to the connector port (3) 107. When connection is detected, processing is transferred to step S3. When connection is not detected, the gate circuit 110 keeps connection with the I/F section (a) 103 so as to allow communication with the I/F section (a) 103 made valid.

In step S3, the gate section 110 opens (invalidates) the connection between the I/F section (a) 103 and the printer system section 2 with a view to preferentially communicating with the digital camera 22 connected to the I/F section (b) 104 in response to the result of detection in step S2. As a result, the individual devices connected to the I/F section (a) 103 deems power for the printer 101 to be turned off, and rebuilds the network except for the printer 101 by a method prescribed in the IEEE1394 Standard.

In step S4, the gate section 110, after releasing connection between the I/F section (a) 103 and the printer system section 102, validates connection between the I/F section (b) 104 and the printer system control section 102.

In step S5, the I/F power supply 108 supplies power necessary for the I/F section (b) to the same. As a result, the I/F section (b) 104 becomes communicable, and begins communication with the digital camera 22.

In step S6, the printer 101 and/or the digital camera 22 may perform communication with the interfaces of the individual digital devices, and begin bus reset, i.e., recognition of the new network, in accordance with the IEEE1394 Standard. As a result of this bus reset, node IDs conforming to the IEEE1394 Standard are set for the printer 101 and the digital camera 22 (step S7).

Upon completion of operations up to step S7, data communication conforming to a prescribed communication protocol is made possible on the IEEE1394 serial bus between the digital camera and the printer 101. It is therefore possible to start printing out an image data taken by the digital camera 22 on the printer 101 (step S8). This cycle of operations is repeated until the end of communication (step S9).

As a result of these operations in the steps as described above, the digital camera 22 can retain the printer 101 in the network, thus permitting one-to-one communication.

Figure 4:
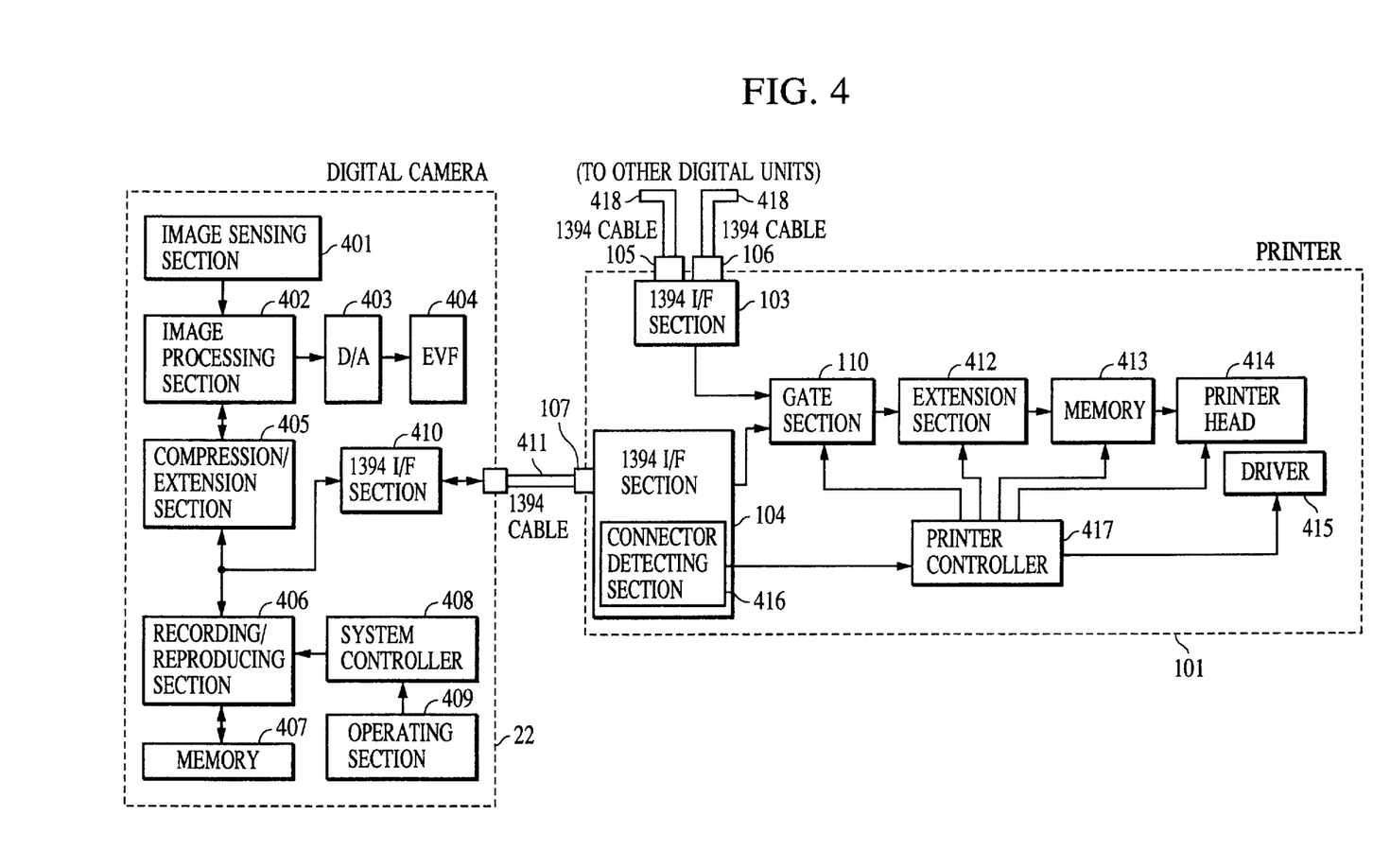
FIG. 4 is a block diagram illustrating a system configured by connecting a digital camera 22 to a connector port (3) 107 of the printer 101.

FIG. 4 is a block diagram illustrating in detail a system built by connecting the digital camera 22 to the connector port (3) 107 of the printer 101. In FIG. 4, the same components as in FIG. 1 are assigned the same reference numerals.

In FIG. 4, 22 is the digital camera; 101 is the printer; 401 is an image sensing section for sensing an object to be photographed; 402 is an image processing section; 403 is a D/A converter; 404 is an EVF (Electric View Finder) displaying an image of the shot object; 405 is a compression/extension section; 406 is a recording/reproducing section recording and reproducing the image data; 407 is a memory recording the image data; 408 is a system controller which controls the digital camera 22; 409 is an operating section; and 410 is a 1394 I/F section mounted on the digital camera 22.

Also in FIG. 4, 104 is the 1394 I/F section (b) connected to the 1394 I/F section 410 of the digital device, i.e., the digital camera 22 via a 1394 serial bus cable 411 of a four-pin terminal; 103 is the 1394 I/F section (a) connected to the plurality of digital devices via a six-pin terminal cable 418 having a maximum transfer rate different from that of the four-pin terminal; 110 is a gate section for selecting and switching any of the I/F sections 102 and 103; 412 is an extension section; 413 is a memory used upon carrying out an operation of forming a print image; 414 is a printer head performing printing; 415 is a print head driver; 416 is a connector detecting section which detects insertion of the connector into the connector port (3) 107 of the I/F section (b) 104; and 417 is the printer controller which controls operations of the entire printer 101. In the compression/extension section 405 and the extension section 412, a still image is compressed and codified by the use, for example, of the JPEG technique.

Now, operations of the printer 101 and the digital camera 22 connected as shown in FIG. 4 will be described.

First, the processing effected upon recording image data of an image taken by the digital camera 22 will be described. The image data of the object taken and generated in the image sensing section 401 are A/D-converted by the image processing section 402, and converted into a standard television signal based on the NTSC technique or the like. An output of the image processing section 402 is converted back into an analog signal by the D/A converter 403 in the form of a shot image, and displayed on the EVF 404. The other output is subjected to a prescribed compression-coding processing based on the JPEG technique or the like in the compression/extension section 405, and recorded in the memory 407 by means of the recording/reproducing section 406.

When reproducing the image data recorded in the memory 407, the recording/reproducing section 406 reads out a desired image from the memory 407 in compliance with an instruction (play command) of the operating section 409. At this point, the selected desired image is controlled and displayed by the system controller 408 on the basis of the information entered from the operating section 409 (image specifying command). More specifically, the still image data reproduced from the memory 401 are extended in the compression/extension section 405, and displayed on the EVF via the image processing section 402 and the D/A converter 403.

The user can cause direct printout of desired image data onto the printer 101 from the camera operating section 409. The system controller 408 displays the desired image data read out from the memory 407 on the EVF 404 in response to an output from the operating section 409, and at the same time, performs control so as to send the same to the I/F section (b) 104 of the digital camera 22. At this point, the image data reproduced by the recording/reproducing section 406 are compressed by the JPEG technique. The image data sent to the I/F section (b) 104 of the digital camera 22 is transferred to the I/F section (a) 103 via the cable 411.

Transfer of the image data is accomplished through isochronous transfer or asynchronous transfer conforming to the IEEE1394 Standard.

The printer 101 usually forms a network together with a plurality of digital devices connected to the I/F section (a) 103, and is set so as to permit communication with the individual devices. When the digital camera 22 as described above is connected to the I/F section (b) 104, the printer controller 417 of the printer 101 controls the gate section 110 and the I/F power supply 108 in response to an output from the connector detecting section 416 so that communication of only the digital device connected to the I/F section (b) 104, i.e., with the digital camera 22 becomes valid.

The still image data transferred from the digital camera 22 to the printer 101 are entered via the gate section 110 into the extension section 412. In the extension section 412, the image data are extended by the use of a JPEG extension program stored in the ROM in the circuit. The extended image data are formed into a printer image suitable for the printer 101 by means of the memory 413, and printed out via the printer head 414. The processing of the printer 101 as described above is controlled by the printer controller 417.

As described above, the printer 101 automatically finishes communication with the I/F section (a) 103 by only connecting the digital camera 22 to the I/F section (b) 104 of the printer 101, and starts communication only with the digital camera connected to the I/F section (b) 104. As a result, it is possible to communicate directly with the printer 101 and conduct printing of the image data from the digital camera 22 without passing through a computer or the like. Since the digital camera 22 can use the printer at this point exclusively, it is possible to accomplish communication of data in a large quantity (such as image data) rapidly without being affected by the other digital devices.

The data bus on the I/F section (a) 103 disconnected from the printer 101 can separately perform communication of 400 Mbps, and the data transfer rate is not limited to 100 Mbps by the presence of a four-pin connector connected to the I/F section (b) 104.

2. Second Embodiment

Figure 5:
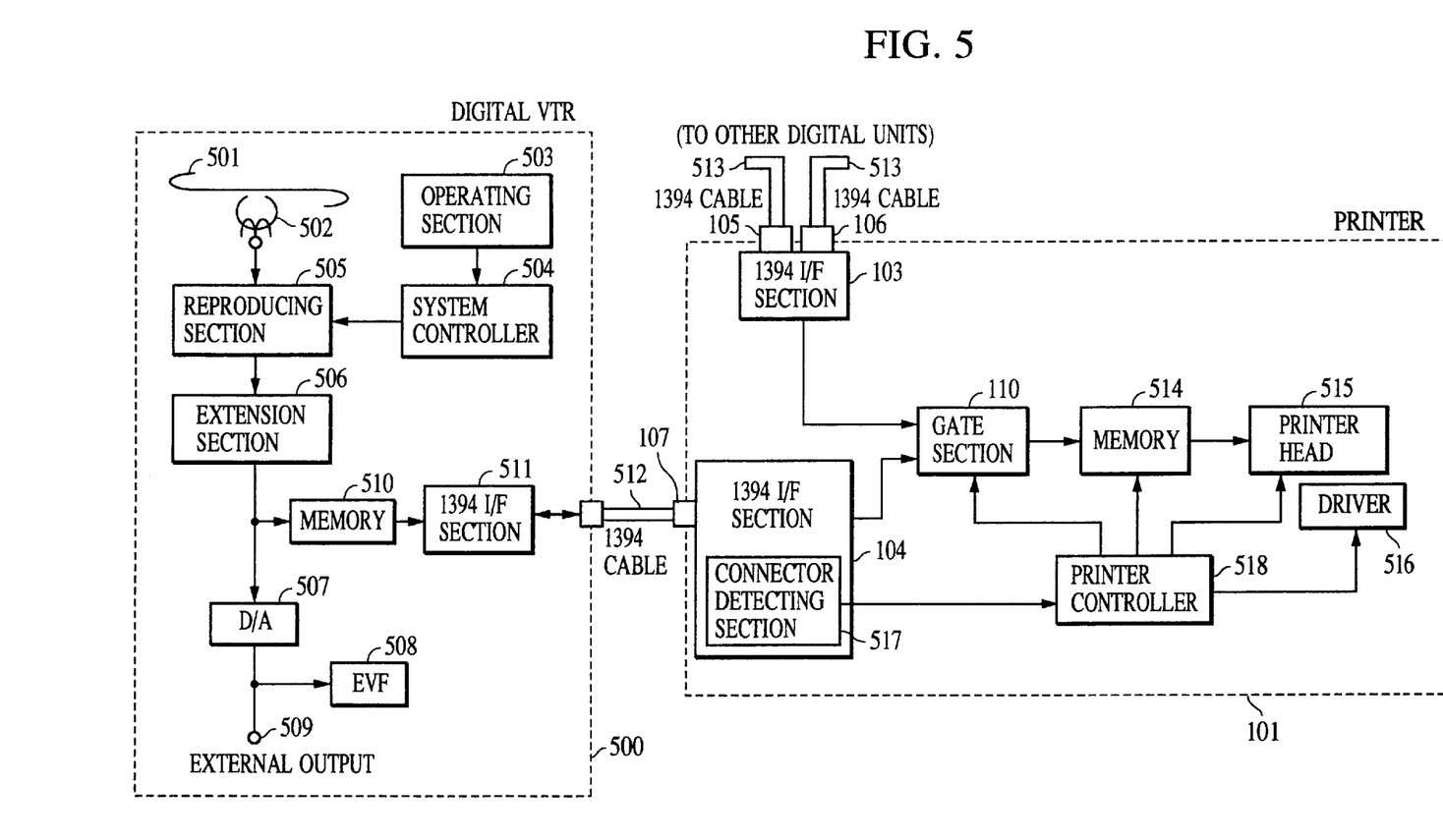
FIG. 5 is a block diagram illustrating a system configured by connecting a digital camera 500 to a connector port (3) 107 of the printer 101.

In a second embodiment of the invention, a configuration in which a digital VTR is connected to the printer 101 shown in FIG. 1 will now be described. In FIG. 5, the same components as in FIG. 1 are assigned the same reference numerals.

FIG. 5 is a block diagram illustrating in detail a configuration in which the digital VTR 500 is connected to the printer 101 described in the first embodiment. As in the first embodiment, the printer 101 and the digital VTR 500 have a digital interface conforming to the IEEE1394 Standard.

In FIG. 5, 500 is a digital VTR; 101 is the printer; 501 is a magnetic tape; 502 is a magnetic head performing recording/reproducing on the magnetic tape; 503 is an operating section which enters operational instructions (play, external output, etc.) for the digital VTR 500; 504 is a system controller which controls the operations of the digital VTR 500; 505 is a reproducing section which reproduces compressed image data recorded on the magnetic tape with the use of the head 502; 506 is an extension section which extends compressed and recorded image data; 507 is a D/A converter; 508 is a display section displaying image data reproduced from the magnetic tape 501 by means of an EVF (Electric View Finder); 509 is an output terminal outputting an image signal of the digital VTR 500; 510 is a memory storing an output from the extension section 506; and 511 is a 1394 serial bus I/F section of the digital VTR 500.

Also in FIG. 5, 104 is a 1394 I/F section (b) connected to the 1394 I/F section 511 of the digital device, i.e., the digital VTR 500 via a four-pin terminal 1394 serial bus cable 512; 103 is a 1394 I/F section (a) connected to a plurality of digital devices via a six-pin terminal cable 513 having a maximum transfer rate different from that of the cable 512; 110 is a gate section which selects and switches the I/F sections 103 and 104; 514 is a memory used when forming a printed image; 515 is a printer head printing an image onto paper; 516 is a print head driver; 517 is a connector detecting section which detects insertion of the connector into the connector port (3) 107 of the I/F section (b) 104; and 518 is a printer controller which controls operations of the entire printer 101.

Now, operations of the printer 101 and the digital VTR 500 connected as shown in FIG. 5 will be described below. In FIG. 5, the digital VTR 500 is connected directly to the printer 101 as in the case of the digital camera 22 shown in FIG. 4.

As the reproducing operation, the digital VTR 500 reproduces desired image data from among compressed image data recorded on the magnetic tape 501 by means of the magnetic head 502. The desired image data are selected by the system controller 504 which controls the magnetic tape 501 and the magnetic head 502 on the basis of information entered from the operating section 503 (image specifying command). The image data thus reproduced are compressed and coded by a prescribed compression method based on DCT (Discrete Cosine Transformation) and VLC (Variable Length coding). The digital VTR 500 extends the same in the extension section 506. The extended image data may be displayed on the EVF 508 via the D/A converter or an image signal may be issued from an external output terminal 509 to an external monitor.

Or, the user may put out the image data recorded in the digital VTR directly onto the printer 101. In this case, the system controller 504 performs control so as to extend an output of the compressed image data from the reproducing section 505 in the extension section 506, once storing the same in the memory 510, and then send the same to the I/F section 511.

The image data sent to the I/F section 511 are packetized by a method conforming to the IEEE1394 Standard, and transferred via the cable 512 to the I/F section (b) of the printer 101. Transfer of the image data between the foregoing I/F section 511 and the I/F section (b) 104 is accomplished by isochronous transfer or asynchronous transfer conforming to the IEEE1394 Standard.

As in the first embodiment, the printer 101 usually forms a network together with a plurality of digital devices connected to the I/F section (a) 103 and is set so as to permit communication with the individual digital devices. When the digital VTR 500 as described above is connected to the I/F section (b) 104, the printer controller 504 of the printer 101 controls the gate section 110 and the I/F power supply 108 in response to an output from the connector detecting section 517, so that communication only with the digital device connected to the I/F section (b) 104 is permitted, i.e., only the digital VTR is valid.

The image data transferred to the printer 101 are formed into a printed image via the gate section 110 in the memory 514, and printed by the printer head 515. The printer controller 518 controls switching of the connecting destination of the gate section 110 and write/read of the memory 514 on the basis of information from the connector detecting section 517. The printer controller 518 controls operation of the driver 112 driving the printer head 109 and a paper feed mechanism not shown.

As described above, the printer 101 of the second embodiment, as in the first embodiment, automatically finishes communication with the I/F section (a) 511 and starts communication with only the digital VTR 500 connected to the I/F section (b) 104 only by connecting the digital VTR 500 to the I/F section (b) 104 of the printer 101. As a result, it is possible to communicate the image data from the digital VTR 500 directly to the printer 101 for printing without passing through a computer or the like. Because the digital VTR 500 can employ the printer exclusively, communication of data in a large quantity (such as image data) can be accomplished rapidly without being affected by other digital devices.

In this embodiment, as in the first embodiment, the data transfer rate of the network disconnected from the I/F section (a) 103 is not limited by the data transfer rate of the I/F section (b) 104.

In this embodiment, as in the first embodiment, furthermore, the printer 101 forms a network together with a plurality of digital devices, and apart from the I/F section (a) 103, the I/F section (b) 104 communicable directly with an output device such as a digital camera 22 may be provided on the front or the side front of the printer 101, thereby permitting easy connection of a portable device such as a digital camera. In the first and second embodiments, the I/F sections (a) and (b) 103 and 104 use an interface conforming to the IEEE1394 Standard. The invention is not however limited to this, but an interface for radio communication based on the IrDA technique may be used for the I/F section (b) 104.

Various variations are possible without deviating from the spirit of the present invention or from the main features thereof. For example, while the embodiments have been described with a digital camera 22 and a digital VTR 500 as a device exclusively operating the printer 101, the invention is applicable also to such digital devices as a DVD (Digital Video Disc) player, an MD (Mini Disc) player and PC (Personal Computer), not limiting to the digital devices mentioned above.

In the embodiments of the invention, the printer 101 has been described as a digital device exclusively used by the digital camera 22 or the digital VTR 500. It is not however limited to the printer 101, but the invention is applicable also to a PC, a hard disk or a scanner. The embodiments shown above are therefore only examples, and should not be construed as limiting.

The scope of the present invention is defined by the claims, and is not constrained at all by the text of the specification. All variants and modifications falling under the scope of claims are with the scope of the present invention.

What is claimed is:

1. A data communication apparatus comprising:
  (a) a first port in a state in which the first port is able to output data;
  (b) a second port in a state in which the second port is able to detect that an external device is connected to said second port; and
  (c) control means for controlling power consumption by said first port and setting said first port in a state in which data output is stopped after said second port detects that an external device is connected to said second port.

2. Apparatus according to claim 1, wherein said control means separates an external device connected to said first port when said first port is set in the state in which data output is stopped.

3. Apparatus according to claim 1, wherein said first port is connected with a first serial interface and said second port is connected with a second serial interface.

4. Apparatus according to claim 3, wherein said first serial interface and said second serial interface conform with IEEE 1394–1995.

5. Apparatus according to claims 1, wherein a number of pins of said first port is different from a number of pins of said second port.

6. Apparatus according to claim 1, wherein a maximum data transfer rate of said first port is different from a maximum data transfer rate of said second port.

7. Apparatus according to claim 1, wherein said first port and said second port conform with IEEE 1394–1995.

8. Apparatus according to claim 1, wherein said second port is disposed on a front of said data communication apparatus.

9. Apparatus according to claim 1, wherein said data communication apparatus is a printer.

10. A data communication apparatus comprising:
(a) a first port and a second port;
(b) detecting means for detecting that an external device is connected to said second port; and
(c) control means for setting said first port in a state in which data output is stopped, wherein said control means sets said first port in the state in which data output is stopped by controlling power consumption by said first port after said detecting means detects that an external device is connected to said second port.

11. Apparatus according to claim 10, wherein said control means separates an external device connected to said first port when said first port is set in the state in which data output is stopped.

12. Apparatus according to claim 10, wherein said first port is connected with a first serial interface and said second port is connected with a second serial interface.

13. Apparatus according to claim 12, wherein said first serial interface and said second serial interface conform with IEEE 1394–1995.

14. Apparatus according to claim 10, wherein said data communication apparatus is a printer.

15. Apparatus according to claim 10, wherein a number of pins of said first port is different from a number of pins of said second port.

16. Apparatus according to claim 10, wherein a maximum data transfer rate of said first port is different from a maximum data transfer rate of said second port.

17. Apparatus according to claim 10, wherein said first port and said second port conform with IEEE 1394–1995.

18. Apparatus according to claim 10, wherein said second port is disposed on a front of said data communication apparatus.

19. A method of controlling a data communication apparatus having (i) a first port in a state in which the first port is able to output data and (ii) a second port in a state in which the second port is able to detect that an external device is connected to the second port, the method comprising the steps of:
controlling power consumption by the first port and setting the first port in a state in which data output is stopped after the second port detects that an external device is connected to the second port.

20. A method according to claim 19, further comprising the step of separating an external device connected to the first port when the first port is set in the state in which data output is stopped.

21. A method according to claim 19, wherein the first port is connected with a first serial interface and the second port is connected with a second serial interface.

22. A method according to claim 21, wherein the first serial interface and the second serial interface conform with IEEE 1394–1995.

23. A method according to claim 19, wherein a number of pins of the first port is different from a number of pins of the second port.

24. A method according to claim 19, wherein a maximum data transfer rate of the first port is different from a maximum data transfer rate of the second port.

25. A method according to claim 19, wherein the first port and the second port conform with IEEE 1394–1995.

26. A method according to claim 19, wherein the second port is disposed on a front of the data communication apparatus.

27. A method according to claim 19, wherein the data communication apparatus is a printer.

28. A method of controlling a data communication apparatus having a first port and a second port, the method comprising the steps of:
(a) detecting that an external device is connected to the second port; and
(b) setting the first port in a state in which data output is stopped, wherein said setting step including setting the first port in the state in which data output is stopped by controlling power consumption of the first port after detecting in said detecting step that an external device is connected to the second port.

29. A method according to claim 28, wherein said setting step separates an external device connected to the first port when the first port is set in the state in which data output is stopped.

30. A method according to claim 28, wherein the first port is connected with a first serial interface and the second port is connected with a second serial interface.

31. A method according to claim 30, wherein the first serial interface and the second serial interface conform with IEEE 1394–1995.

32. A method according to claim 28, wherein the data communication apparatus is a printer.

33. A method according to claim 28, wherein a number of pins of the first port is different from a number of pins of the second port.

34. A method according to claim 28, wherein a maximum data transfer rate of the first port is different from a maximum data transfer rate of the second port.

35. A method according to claim 28, wherein the first port and the second port conform with IEEE 1394–1995.

36. A method according to claim 28, wherein the second port is disposed on a front of the data communication apparatus.

37. A data communication apparatus comprising:
a first port;
a second port that outputs a control signal in response to a digital device being connected to said second port; and
control means for, in response to said second port outputting a control signal, inhibiting output of signals from said first port, and reducing power consumption by said first port.

38. Apparatus according to claim 37, wherein said control means, in response to said second port outputting a control signal, causes the apparatus to be reconfigured as a direct printer.

39. Apparatus according to claim 37, wherein said control means, in response to said second port outputting a control signal, causes the apparatus to be reconfigured without a network.

40. Apparatus according to claim 37, wherein said control means separates an external device connected to said first port, in response to said second port outputting a control signal.

41. Apparatus according to claim 37, wherein said control means comprises:
a gate which controls data input/output to/from said first port and said second port; and
a switch which controls a supply of power between said first port and said second port.

42. Apparatus according to claim 37, wherein said second port is disposed on a front face of the apparatus.

43. Apparatus according to claim 37, wherein said first port is connected with a first serial interface and said second port is connected with a second serial interface.

44. Apparatus according to claim 43, wherein said first serial interface and said second serial interface conform with IEEE 1394–1995.

45. Apparatus according to claim 37, wherein said control means inhibits output of signals from said first port by completing any existing network communications through said first port, and then prohibiting any communication through said first port.

46. An apparatus according to claim 37, wherein a number of pins of said first port is different from a number of pins of said second port.

47. Apparatus according to claim 37, wherein a maximum data transfer rate of said first port is different from a maximum data transfer rate of said second port.

48. A data communication method comprising the steps of:

outputting network communications through a first port in a data communication apparatus;

detecting that a digital device is connected to a second port of the data communication apparatus;

outputting a control signal from the second port in response to detecting in said detecting step that a digital device is connected to the second port; and     after a control signal is output from the second port, (i) inhibiting output of signals from the first port, and (ii) inhibiting power consumption by the first port.

49. A method according to claim 48, wherein the data communication apparatus comprises a network printer, said method further comprising the step of, in response to a control signal output from the second port, causing the printer to be reconfigured as a direct printer.

50. A method according to claim 49, further comprising the step of, in response to a control signal output from the second port, causing the network to be reconfigured without the printer.

51. A method according to claim 49, wherein the second port includes a physical layer which performs the step of detecting that a digital device is connected to the second port and outputting the control signal.

52. A method according to claim 49, further comprising the steps of:

controlling data input/output to/from the first port and the second port with a gate; and     controlling a supply of power between the first port and the second port with a switch.

53. A method according to claim 49, wherein said step of inhibiting power consumption by the first port is performed by completing any existing network communications through the first port, and then prohibiting any communication through the first port.

* * * * *

UNITED STATES PATENT AND TRADEMARK OFFICE
CERTIFICATE OF CORRECTION

PATENT NO. : 6,336,155 B1  Page 1 of 1
DATED : January 1, 2002
INVENTOR(S) : Masamichi Ito et al.

It is certified that error appears in the above-identified patent and that said Letters Patent is hereby corrected as shown below:

Column 1,
Line 21, "have" should be deleted.

Column 63,
Line 63, "another" should read -- other --.

Column 14,
Line 9, "including" should read -- includes --.

Signed and Sealed this

Twenty-fifth Day of June, 2002

Attest:

JAMES E. ROGAN
Attesting Officer  Director of the United States Patent and Trademark Office